US008562710B2

(12) United States Patent
Palmer et al.

(10) Patent No.: US 8,562,710 B2
(45) Date of Patent: Oct. 22, 2013

(54) FERTILISER COMPOSITION

(75) Inventors: Scott Andrew Palmer, New South Wales (AU); Nicole Joanne Scott, New South Wales (AU); James Matthew White, New South Wales (AU)

(73) Assignee: Duluxgroup (Australia) Pty Ltd., Victoria (AU)

( * ) Notice: Subject to any disclaimer, the term of this patent is extended or adjusted under 35 U.S.C. 154(b) by 0 days.

(21) Appl. No.: 13/125,680

(22) PCT Filed: Oct. 23, 2009

(86) PCT No.: PCT/AU2009/001394
§ 371 (c)(1),
(2), (4) Date: Sep. 19, 2011

(87) PCT Pub. No.: WO2010/045687
PCT Pub. Date: Apr. 29, 2010

(65) Prior Publication Data
US 2011/0314882 A1 Dec. 29, 2011

(30) Foreign Application Priority Data
Oct. 24, 2008 (AU) ................................. 2008905521

(51) Int. Cl.
*C05F 3/02* (2006.01)
*C05F 11/00* (2006.01)

(52) U.S. Cl.
USPC .................. 71/11; 71/15; 71/17; 71/21; 71/23

(58) Field of Classification Search
USPC ........................................ 71/11–30
See application file for complete search history.

(56) References Cited

U.S. PATENT DOCUMENTS

| 5,772,721 A * | 6/1998 | Kazemzadeh | 71/11 |
|---|---|---|---|
| 5,785,730 A * | 7/1998 | Miknevich et al. | 71/22 |
| 6,409,788 B1 * | 6/2002 | Sower | 71/11 |
| 6,517,599 B2 * | 2/2003 | Gilbert | 71/15 |
| 6,829,860 B1 | 12/2004 | Lee et al. | |
| 7,213,366 B1 | 5/2007 | Ahm | |
| 2003/0205072 A1 * | 11/2003 | Van Der Merwe | 71/27 |
| 2004/0011102 A1 | 1/2004 | Sears | |
| 2004/0069031 A1 * | 4/2004 | Krysiak et al. | 71/27 |
| 2004/0069032 A1 * | 4/2004 | Krysiak et al. | 71/27 |
| 2004/0074271 A1 * | 4/2004 | Krysiak et al. | 71/27 |
| 2006/0107589 A1 | 5/2006 | Rubin | |
| 2010/0083719 A1 * | 4/2010 | Peppmoller et al. | 71/27 |
| 2010/0139346 A1 * | 6/2010 | Burnham | 71/12 |
| 2012/0103038 A1 * | 5/2012 | Rubin | 71/23 |

FOREIGN PATENT DOCUMENTS

| JP | 60-65784 | * | 4/1985 |
|---|---|---|---|
| JP | 62-115211 | * | 5/1987 |
| JP | 63-44817 | * | 2/1988 |
| JP | 8-208362 | * | 8/1996 |
| JP | 2006-174815 | * | 7/2006 |
| WO | 87/07851 A1 | | 12/1987 |

OTHER PUBLICATIONS

International Search Report and Written Opinion from corresponding PCT Application No. PCT/AU2009/001394 dated Dec. 18, 2009.
Derwent WPI Online Abstract Accession No. 1995-374073.

* cited by examiner

*Primary Examiner* — Wayne Langel
(74) *Attorney, Agent, or Firm* — McDermott Will & Emery LLP

(57) ABSTRACT

This invention relates to a storage stable fertilizer composition in the form of pellets or granules comprising an organic fertilizer in admixture with a water absorbent polymer. This invention also relates to a process for producing a storage stable fertilizer composition, the process comprising: i) mixing an organic fertilizer and a water absorbent polymer to form a mixture; ii) pelletizing or granulating the mixture; and iii) drying the pellets or granules for a time and under conditions sufficient to form a storage stable fertilizer composition.

23 Claims, No Drawings

FERTILISER COMPOSITION

RELATED APPLICATIONS

This application is the U.S. National Stage of International Application No. PCT/AU2009/001394, filed Oct. 23, 2009, which claims the benefit of Australian Application Serial No. 2008905521, filed Oct. 24, 2008.

FIELD OF THE INVENTION

The present invention relates to fertilisers and in particular to stable fertiliser compositions in the form of pellets or granules, and processes for the production of stable fertiliser compositions in the form of pellets or granules. The invention especially relates to such stable fertiliser compositions comprising organic fertiliser and water absorbent polymer and processes for the production thereof. It is convenient to discuss the invention with reference to its application to the establishment of new turf, however it is to be understood that the fertiliser pellets and granules of the invention are useful outside this specific application.

BACKGROUND OF THE INVENTION

To establish new turf it is usually necessary to apply fertiliser and also to water regularly. A greater amount of fertiliser and water is required to establish new turf than to maintain existing turf. The type of fertiliser used and the manner of irrigation will affect the rate of turf growth, the structure of the soil and the root structure of the turf as it grows.

Appropriate fertilisers for turf advantageously comprise a source of nitrogen, phosphorous and potassium. These nutrients may be found in an inorganic or synthetic fertiliser, or in an organic fertiliser.

While inorganic or synthetic fertilisers are often utilised, over application of such fertilisers may be toxic to turf, due to their water solubility. This may also lead to damage to the environment, through leaching of the fertiliser into waterways.

In contrast, over application of organic fertilisers is not usually detrimental to turf, as the water soluble content of such fertilisers is normally quite low. Organic fertilisers may also biodegrade over an extended period of time, improve moisture retention and promote microbial and earthworm activity.

The water applied to turf may be lost through evaporation, transpiration (emission of water vapour from the leaves of the turf), infiltration and percolation of water through the soil, and water runoff. Due to variations in climate and soil structure, the exact amount of water that must be applied to establish or maintain turf will vary. If the consumer applies too little water, the turf may fail. However, excessive watering will lead to waste.

New turf should be watered each day for adequate establishment. The amount of water required may be substantial, and in some cases 4 mm of water may be required per day in the first five weeks after laying to establish new turf. Australian turf production per annum is 6500 hectares (65 million m$^2$), and therefore to bed all of this turf would require on the order of 9.1 mega liters in the first five weeks after laying.

To decrease the amount of water required, products such as water absorbent polymers (water crystals) or soil wetting agents are often used. Soil wetting agents help soils to absorb water by decreasing their hydrophobicity. In contrast, water absorbent polymers absorb and retain water for the roots of turf to use. When these polymers are present in soil, it is not necessary to water as frequently as water loss is diminished.

Substantially more fertiliser is generally added to soil to establish new turf than other products, such as water absorbent polymers or soil wetting agents. Accordingly, it can be time consuming and difficult to apply the correct proportions of each product to the soil.

A traditional method of applying multiple products simultaneously would be to simply mix the products together to form a "salt and pepper" mixture. However, during the course of production, distribution and/or application, settling may occur, which in turn limits the ability of each product to be applied at the correct rates due to phase separation based on particle size.

SUMMARY OF THE INVENTION

It has now been surprisingly found possible to prepare stable granules or pellets containing both organic fertiliser and water absorbent polymer.

Accordingly, in one aspect of the present invention there is provided a storage stable fertiliser composition in the form of pellets or granules comprising an organic fertiliser in admixture with a water absorbent polymer.

To form a storage stable composition according to the invention the amount of water in the composition should be carefully controlled. This is because while an amount of water is generally necessary to form pellets or granules, water absorbent polymers expand as they absorb water. The expansion of such polymers may adversely affect the structure of the composition.

Therefore, in another aspect of the present invention there is provided a process for producing a storage stable fertiliser composition, the process comprising:
 (i) mixing an organic fertiliser and a water absorbent polymer to form a mixture;
 (ii) pelletising or granulating the mixture; and
 (iii) drying the pellets or granules to form a storage stable fertiliser composition.

DESCRIPTION OF PREFERRED EMBODIMENTS

The composition according to the invention comprises an organic fertiliser in admixture with a water absorbent polymer.

The organic fertiliser may be any material capable of fertilising soil or plant matter, which is produced from animal matter, plant matter or combinations thereof. This fertiliser may or may not be processed prior to use. However, in many cases it may be advantageous to provide the organic fertiliser in the form of a meal.

In one embodiment, the organic fertiliser comprises plant matter, such as green manure. In another embodiment the organic fertiliser comprises plant meal.

The plant matter may be produced from one or more of crops, grasses, trees or shrubs. In one embodiment, the plant matter is produced from crops. The plant matter may comprise by-products of the grain industries, such as from a leguminous plant. Leguminous plants include forage legumes and grain legumes. In one embodiment, the plant matter is produced from one or more forage legumes, such as lucerne (alfalfa), clover, vetch or stylo. In one embodiment, the plant matter is produced from lucerne. The plant matter may also be derived from wine production, such as grape marc.

In another embodiment, the plant matter is produced from a plant or algae that grows in waterways or the ocean, such as seaweed. In a further embodiment, the plant matter is produced from kelp, and may comprise kelp meal.

In a further embodiment, the organic fertiliser may comprise animal matter. The animal matter may be made from any part of an animal or may be manure, or may be a combination thereof. For example, the organic fertiliser may comprise blood meal, which is produced from the dried blood of animals. The organic fertiliser may also comprise meat meal or fish meal.

In another embodiment, the organic fertiliser comprises animal manure. The animal manure may be from a herbivore, a carnivore, or an omnivore, or may be a mixture of different animal manures. Such animal manures may include manure from cows, chickens, goats, alpacas, sheep, pigs, horses, turkey, geese, ducks, rabbits and bats, and combinations thereof. In one embodiment, the organic manure is chicken or cow manure.

The animal manure may be chicken manure. The manure may be meat chicken manure or egg chicken manure, or a mixture of meat chicken manure and egg chicken manure. Meat chicken manure is manure that is produced by chicken that are bred for their meat, whereas egg chicken manure is manure that is produced by chicken that are bred for their eggs. In one embodiment, the manure is from 9:1 meat chicken manure to egg chicken manure, to 1:1 meat chicken manure to egg chicken manure. In another embodiment, the manure is from 4:1 meat chicken manure to egg chicken manure, to 2:1 meat chicken manure to egg chicken manure. In a further embodiment, the manure is approximately 3:1 meat chicken manure to egg chicken manure.

Many organic fertilisers degrade slowly, and some may require water and the presence of microorganisms to degrade. Accordingly, the organic fertiliser may be capable of providing sustained release of nutrients.

The organic fertiliser may be able to provide nutrients to a plant including one or more of nitrogen, phosphorous, potassium, calcium, sulphur, magnesium, boron, chloride, manganese, iron, zinc, copper, molybdenum and selenium. In one embodiment, the organic fertiliser may be able to provide nutrients to a plant including one or more of nitrogen, phosphorous, potassium, calcium, sulphur and magnesium. In a further embodiment, the organic fertiliser may be able to provide nutrients to a plant including one or more of nitrogen, phosphorous and potassium.

The composition according to the invention also comprises a water absorbent polymer. Water absorbent polymers are also known as water crystals, or superabsorbent polymers, and in some cases are also known as hydrogels. These polymers absorb aqueous solutions through hydrogen bonding with water molecules. In some cases, a water absorbent polymer will be able to absorb up to or more than 400 times its weight of water, depending on the salinity of its surroundings. As the polymer absorbs water it expands or swells.

In one embodiment, the water absorbent polymer comprises ionic groups, such as carboxylates, ammonium salts or metal ions (such as alkaline or alkaline earth metal salts, including potassium or sodium). Such charged groups act to increase osmotic pressure in the polymer and assist the polymer to absorb water. However, it would be appreciated that in higher salinity environments this osmotic pressure is diminished and the amount of water that may be absorbed by the polymer is decreased.

The water absorbent polymer may also contain some crosslinking. In one embodiment, the water absorbent polymer is selected from a polyacrylamide copolymer, poly (acrylic acid) copolymer, ethylene maleic anhydride copolymer, cross-linked carboxy-methyl-cellulose, polyvinyl alcohol copolymer, cross-linked polyethylene oxide and starch grafted copolymer of polyacrylonitrile. The polymer may also be a sulphonated polystyrene, styrene-acrylonitrile copolymer (SAN) or a co or terpolymer of styrene butadiene and an acrylate. Such acrylates may include methyl methacrylate, methyl acrylate, ethyl acrylate or ethyl methacrylate. In another embodiment, the water absorbent polymer is corn starch, carbonised rice hulls or husks, or derivatives thereof. The polymer may also be toughened, such as through the inclusion of a rubbery polymer such as a high impact polystyrene (HIPS) or a styrene acrylonitrile copolymer grafted onto a butadiene rubber (ABS). The water absorbent polymer may be a crosslinked copolymer of acrylic acid and acrylamide partially neutralized as potassium/ammonium salt, such as Stockosorb.

Water absorbent polymers of a variety of sizes may be used in the present invention. The size of the polymer may affect the volume of water that may be absorbed and the rate of water absorption. Accordingly, it may be preferable to utilise a smaller or a larger polymer depending on the amount of rainfall, irrigation, soil structure and climate in the area in which the composition according to the invention is to be applied. Polymers that are micro or macro in size may be used. In one embodiment, the water absorbent polymer is from 0.2 mm to 4 mm in size, preferably from 1.4 mm to 4 mm in size. Once applied to the soil, the water absorbed by the water absorbent polymer may be utilised by plants.

In addition to an organic fertiliser and a water absorbent polymer, the composition according to the invention may also comprise one or more further components. In one embodiment, the composition comprises an inorganic or synthetic fertiliser. The inorganic or synthetic fertiliser may be a phosphate, a nitrate, a urea, a sulphate, a chloride, a calcium complex, a potassium complex, an ammonia or ammonium complex, or a potassium complex. In one embodiment, the inorganic or synthetic fertiliser is an ammonium phosphate, an ammonium sulphate, a potassium sulphate, a calcium phosphate or a potassium chloride. In a further embodiment, the inorganic or synthetic fertiliser is monoammonium phosphate (MAP), diammonium phosphate (DAP), sulphate of ammonia (SOA), an ammonium sulphate such as Gran Am, sulphate of potash (SOP), a superphosphate, Nitrophoska (a nitrogen, phosphorous and potassium fertiliser containing the nitrification inhibitor 3,4-dimethylpyrazolephosphate (DMPP)), or a nitrogen, phosphorous and potassium controlled release fertiliser such as Nutricote. In one embodiment, the inorganic or synthetic fertiliser is a complex between phosphate and ammonia, such as diammonium phosphate (DAP) or monoammonium phosphate (MAP).

The composition according to the invention may also comprise one or more nitrification inhibitors. Nitrification inhibitors are designed to slow down the nitrification process in soil, decreasing the likelihood that large losses of nitrates will occur before the nitrates can be taken up by the desired plants. Nitrification inhibitors may include 3,4-dimethylpyrazolephosphate (DMPP), 2-chloro-6-(trichloromethyl)-pyridine (N-Serve), 5-ethoxy-3-trichloromethyl-1,2,4-thiadiazol (Dwell, Terrazole), dicyandiamide (DCD), 2-amino-4-chloro-6-methyl-pyrimidine (AM), 2-mercapto-benzothiazole (MBT), 2-sulfanilamidothiazole (ST) or thiourea (TU). In one embodiment, the composition comprises 3,4-dimethylpyrazolephosphate (DMPP).

Different types of organic fertilisers have different water contents and compositions that will affect the ability of the mixed composition to form stable pellets or granules, and different water absorbent polymers have different water absorbing properties and swelling properties. Accordingly, it is important to ensure that the appropriate amount of organic fertiliser is combined with the appropriate amount of the water absorbing polymer so that stable pellets and granules can be formed.

The composition according to the present invention may comprise one or more organic fertilisers, one or more water absorbent polymers, and may optionally also comprise plant meal, or other components. In one embodiment, the water absorbent polymer comprises from 1% to 15% of the composition, preferably from 2% to 10% of the composition, more preferably from 4% to 8% of the composition, and most preferably from 5% to 7.5% of the composition. In another embodiment, the organic fertiliser comprises from 85% to 99% of the composition, preferably from 90% to 98% of the composition, more preferably from 92% to 96% of the composition, and most preferably from 92.5% to 95% of the composition. In one embodiment, the ratio of water absorbent polymer to organic fertiliser in the composition is from 1:99 to 3:17, preferably from 1:49 to 1:9, more preferably from 1:24 to 2:23, and most preferably from 1:19 to 3:37.

The organic fertiliser may comprise animal manure and plant meal. In one embodiment, animal manure comprises from 65% to 99% of the composition, preferably from 75% to 90% of the composition, and most preferably from 80% to 85% of the composition. In another embodiment, plant meal may comprise from 0% to 35% of the composition, preferably from 5% to 20% of the composition, more preferably 7.5% to 12.5%, and most preferably approximately 10% of the composition.

The composition according to the present invention comprises an organic fertiliser and a water absorbent polymer and is storage stable. As used herein, a storage stable composition is a composition that, once formed, maintains its structure sufficiently to be packaged and stored for distribution, so that the product is still in the pelletised or granulated form when used by the consumer. In one embodiment, the composition will maintain its pelletised or granulated form when stored for one or more of 3, 6, 9 or 12 months at ambient temperature and pressure. The composition may be stored, for example in a package, which is sealed from the outside atmosphere. The composition may also be stored in an environment such that it is exposed to water vapour in the outside atmosphere.

The composition according to the present invention is also in the form of pellets or granules. As used herein, a granule is from 1.5 mm to 4 mm in size.

Either pellets or granules may be advantageous to the consumer. When the water absorbent polymer in the composition is exposed to water, the polymers swell and assist the decomposition of the granule or pellet.

As granules have a greater surface area than pellets, water will access the water absorbent polymer in the granules more rapidly, leading to more rapid decomposition of the granule and the more rapid provision of nutrients to plants. On the other hand, water will access the water absorbent polymers present in the pellet far more slowly, providing a more gradual decomposition and more gradual provision of nutrient to plants.

The bulk density of these pellets or granules may also be important. If the pellet or granule is not dense enough it may be washed away when watered, or may be blown away by the wind. Similarly, higher bulk densities may result in improved accuracy of placement of the composition, more accurate delivery of nutrient loading, and smaller transport and logistics costs. In addition, compositions with a higher bulk density may be advantageously used with mechanical spreaders.

In one embodiment, the bulk density of the composition is from 350 to 900 kilograms per cubic meter, preferably from 450 to 750 kilograms per cubic meter, more preferably from 450 to 650 kilograms per cubic meter, and most preferably from 500 to 550 kilograms per cubic meter. It would be anticipated that if, for example, a greater proportion of inorganic fertiliser is present in the composition, then the bulk density of the composition may also be greater.

The amount of water present in the composition according to the present invention may affect the stability of the pellets or granules formed. Accordingly, it can be important to control the amount of water present at various stages in the preparation of the pellets or granules.

In the process according to the present invention an organic fertiliser is mixed with a water absorbent polymer. In one embodiment, the mixed composition is formed by mulling a mixture that comprises an organic fertiliser and a water absorbent polymer. As used herein, "mulling" means to mix over and over.

While it may not be necessary, heat may be applied when the organic fertiliser and the water absorbent polymer is mixed or mulled. In one embodiment, the organic fertiliser and the water absorbent polymer is mixed or mulled at from 5° C. to 80° C., preferably from 7.5° C. to 60° C., more preferably from 10° C. to 40° C. and most preferably from 15° C. to 30° C. In another embodiment, the organic fertiliser and the water absorbent polymer is mixed or mulled at ambient temperature.

The amount of time required to mix or mull the organic fertiliser and the water absorbent polymer will depend upon the amount of material. For example, for 10 T of material a mixing or mulling time of about 10 minutes may be sufficient. Accordingly, in one embodiment of the present invention, the organic fertiliser and the water absorbent polymer is mixed or mulled for from 1 minute to 30 minutes, preferably from 3 minutes to 20 minutes, more preferably from 5 minutes to 15 minutes, and most preferably about 10 minutes.

If not enough water is present in the mixture, then the mixture will not form into pellets or granules. However, if too much water is present in the mixture, it becomes difficult to dry the composition sufficiently to form a composition that is storage stable. In one embodiment, the water present in the mixture in step (i) is present in the organic fertiliser. Alternatively, water may be added in step (i) of the process according to the present invention.

The amount of water required in the mixture in step (i) will vary depending on the type of water absorbent polymer and the type of organic fertiliser utilised. Accordingly, in one embodiment the moisture content of the mixture is from 12% to 35%, preferably from 18% to 30%, and more preferably from 22% to 26%.

After forming the mixture, the mixture may be subjected to further treatment steps prior to pellet or granule formation.

In one embodiment, magnetic particles may be separated from the mixture using a magnetic separator. The removal of magnetic particles advantageously limits the potential for metal contaminant to damage equipment in the production process, and thus improves the reliability of the production process. The absence of such contaminants from the composition may also be advantageous to consumers.

The presence of aggregates in the mixture may be problematic in the formation of pellets or granules. Accordingly, in one embodiment, any aggregates are broken apart with a hammermill, and following this the mixture is screened to remove aggregates that are larger than a desired size.

Immediately prior to the formation of pellets or granules it may be advantageous to condition the mixture using a conditioner. This conditioning step may involve the application of steam. The step of conditioning may improve the compressibility and binding properties of the mixture, and may also act to lubricate the mixture and reduce friction during the formation of pellets or granules. However, the application of steam may also affect the water crystals.

The mixture may be formed into pellets or granules using a pellet mill. A pellet mill compresses the mixture, extrudes it and then cuts it to the desired length to form pellets. A certain amount of water is necessary in the mixture to produce pellets or granules. Granules may also be formed without the use of a pellet mill.

As the water absorbent polymer will continue to absorb water from the mixture, it is important that the mixture is processed without undue delay. For example, in one embodiment pellets or granules are formed from the mixture following step (i) within one hour after mixing. In another embodiment, pellets or granules are formed from the mixture following step (i) within 30 minutes after mixing.

After the pellets or granules are formed, they are dried. The step of drying the pellets or granules dehydrates the composition and allows the water absorbent polymers to return to an essentially inactive state. Accordingly, a longer than normal initial drying temperature is often required. In one embodiment, the initial drying step occurs from 2 to 8 minutes, 8 to 12 minutes, 12 to 15 minutes or 15 to 20 minutes. In another embodiment, the initial drying step occurs from 1 to 20 minutes, preferably from 1 to 15 minutes, more preferably 1 to 12 minutes, more preferably from 1 to 8 minutes, and most preferably from 2 to 8 minutes. The drying step may be at a temperature of from ambient temperature to 150° C., preferably from 50° C. and 150° C., more preferably from 70° C. to 150° C., or most preferably from 90° C. to 130° C. While in many embodiments, the drying step is performed with one or more dryers, this may not be necessary in all embodiments of the invention.

Multiple drying steps may be employed. In one embodiment, the pellets or granules are subjected to from one to ten drying steps. In another embodiment, the pellets or granules are subjected to from one to seven drying steps. In a further embodiment, the pellets or granules are subjected to from one to five drying steps.

If multiple drying steps are employed, each drying step may be at successively decreasing temperatures. This may be achieved by changing the temperature in a single drier, or by using multiple driers at different temperatures. If multiple driers are employed, then the pellets or granules may be moved manually between the driers, or the pellets or granules may be transferred between the driers in an automated fashion, for example using a conveyor belt.

After drying, the pellets or granules are cooled before further processing, if necessary.

If necessary, the pellets or granules may be crumbled. While granules may be formed directly from the mixture comprising the organic fertiliser and the water absorbent polymer, in one embodiment granules are be formed from pellets using a crumbler. The size of the granule desired can be set by the separation distance in the apparatus.

In another embodiment, the pellets or granules may be screened to produce pellets or granules of substantially similar dimensions prior to packaging.

The pellets or granules may also be coated prior to packaging, such as through the use of a liquid sprayer or through "salt and pepper" mixing. For example, the pellets or granules may be coated with anti-caking or anti-dust agents, agents to control the release of nutrients from the composition, agents to control the water permeability of the composition, nitrification inhibitors or minerals.

Advantageously, the provision of a water absorbent polymer and an organic fertiliser in a single composition allows for the easy application of the composition for nutrition and water retention, either via the use of a mechanical spreader for large scale application or via hand application for smaller jobs.

The use of an organic fertiliser in the composition may improve soil organic matter content, increase soil water holding capacity, improve soil structure and enhance soil cation exchange capacity (which facilitates greater nutrient retention). These features may enhance the subsequent application of organic or inorganic/synthetic fertilisers.

In addition, the organic fertiliser biodegrades through microbial activity in the soil, which allows the gradual release of nitrogen, phosphorous, potassium and trace elements. The water soluble content of organic fertilisers may also be very low, which is an advantage over inorganic/synthetic fertilisers with readily soluble nutrition that can leach into waterways.

The presence of the water absorbent polymer with the organic fertiliser in a single composition will also affect the rate of decomposition of the organic fertiliser through the swelling of the polymer once exposed to water. This may promote stronger root development of plant matter, and especially new turf, for faster establishment. This occurs through the creation of root channels via the degrading manure, which provides easy access to the water absorbent polymer.

The presence of the water absorbent polymer also improves water infiltration rates and reduces run-off rates and plant transpiration rates. The impact of soil porosity effects in the drainage of water may also be reduced.

Experiments have also revealed that the water absorbent polymer in the composition according to the present invention will exhibit similar characteristics to a loose water absorbent polymer when applied to soil. That is, the polymer will swell and contract through water absorption and dehydration approximately the same number of times whether in the composition according to the invention or applied loose. It is believed that the polymer will be able to swell and contract in this manner for a period in excess of three years.

However, the water absorbent polymer in the composition according to the present invention may not be able to absorb as much water as a water absorbent polymer when applied loose to the soil. As discussed above, the salinity of the surroundings of the water absorbent polymer will affect its ability to absorb water. If the organic fertiliser is more saline, then the water absorbent polymer will be less able to absorb water. Nevertheless, it would be anticipated that as the composition degrades the salinity of the environment surrounding the water absorbent polymer will decrease and the water absorbent polymer will be able to absorb more water.

Certain embodiments of the invention will now be described with reference to the following examples which are intended for the purpose of illustration only and are not intended to limit the scope of the generality hereinbefore described.

DETAILED DESCRIPTION OF AN EMBODIMENT OF THE INVENTION

Example 1

Composted chicken manure (moisture content 32.4%) and Stockosorb 660 crystals were evaluated to identify an optimum ratio of manure to Stockosorb.

Five glass dishes were set up to establish how differing quantities of water absorbent polymer affected water uptake of the manure. Stockosorb 660 micro was used for these experiments. The results are provided in Table 1.

TABLE 1

Evaluation of the water absorption capacity of manure/Stockosorb mixtures

|  | Manure | Amount of Stockosorb | Water added | Comments | Water added | Comments |
|---|---|---|---|---|---|---|
| Control | 100 g manure | None | 100 ml | Little absorption of water after 3 mins | | |
| Sample 1 | 99 g manure | 1 g | 100 mL | Unable to absorb water after 3 mins | 50 mL | Fully absorbed in 1.06 minutes |
| Sample 2 | 98 g manure | 2 g | 100 mL | No free water after 3.21 minutes | 50 mL | No free water after 41 secs |
| Sample 3 | 95 g manure | 5 g | 100 mL | No free water after 1.26 minutes | 100 mL after 40 hours drying | No free water after 9 secs |
| Sample 4 | 92.5 g manure | 7.5 g | 100 mL | No free water after 1.08 minutes | 100 mL after 40 hours drying | No free water after 9 secs |

These experiments illustrate that while chicken manure is quite hydrophobic, the presence of Stockosorb substantially increases the rate at which water is absorbed by the sample. As the proportion of Stockosorb is increased, the rate at which the sample absorbs water also increases.

As shown in the table above, the samples are able to absorb 50 mL of water much more rapidly than 100 mL water. In addition, if the sample is dried to reduce the quantity of water present in the sample, then the sample will also be able to absorb water far more rapidly.

Other experiments indicate that the addition of a wetting agent such as Lutensol to the control sample also reduces the time for water absorption. In addition, it was found that medium grade Stockosorb 500 was easier to mix into the manure than Stockosorb 660 micro, which clumped due to rapid uptake of water.

From these experiments, the composition comprising 5% and 7.5% Stockosorb were selected for further evaluation.

Example 2

Pellets and granules of the composition were next prepared.

A mixture comprising 3:1 mixture of meat chicken manure to egg chicken manure with 5% Stockosorb 500 medium was mulled for 5 minutes.

It was found that this mixture should have a mulled moisture content of no more than 26%, otherwise too much moisture is absorbed by the water absorbent polymer. However, if the moisture content of this mixture is less than 22%, then a product that is adequate for further processing may not be formed.

Within 15 minutes after mulling, the mixture was placed in an intake hopper. Following this, the mixture was treated with a magnetic separator, a hammermill, screened, and then conditioned, before the formation of pellets using a pellet mill. Pellets were formed using a pellet mill within 30 minutes after mulling was completed.

Following pellet formation, the pellets were placed in a drier. A five stage drier was employed with temperatures set at 130° C. (set) for Stage 1, 125° C. (set) for Stage 2, 85° C. for Stage 3, 76° C. for Stage 4 and 56° C. for Stage 5. Each drying stage was performed for 4 minutes.

After drying, the pellet was cooled in a cooler. If necessary, the pellets were then crumbled with a crumbler to produce granules.

The pellets or granules were then screened to provide a composition of relatively consistent dimensions.

Example 3

A series of compositions were evaluated to determine their water absorption capacity, as outlined in Table 2. These compositions were prepared according to the procedure outlined in Example 2.

TABLE 2

Evaluation of composition water absorption capacity

| | Amount of composition | Type | Amount of Stockosorb | Amount of Water added | Comments |
|---|---|---|---|---|---|
| Control 1 | None | — | 2.5 g | 200 mL | No free water after 25 mins |
| Control 2 | 50 g | Granules | None | 200 mL | Free water after 24 hours |
| Composition 1 | 50 g | Pellets | 5% | 200 mL | Free water after 24 hours although less than control 2 |
| Composition 2 | 50 g | Granules formed using a mortar and pestle | 5% | 200 mL | Free water after 24 hours although less than other samples |

Composition 2 absorbed more water than composition 1, presumably due to the increased surface area of the granulated product which allows the water to access the polymer more rapidly.

In another series of experiments, different amounts of water were added to composition 1 in Table 2.

TABLE 3

Evaluation of the water absorbing capacity of Composition 1, Table 2

| | Amount of composition | Amount of Stockosorb | Amount of Water added | Comments |
|---|---|---|---|---|
| Experiment 1 | 50 g | 5% | 25 mL | No free water after 3 mins |
| Experiment 2 | 50 g | 5% | 50 mL | No free water after 25 mins |
| Experiment 3 | 50 g | 5% | 100 mL | No free water after 4 hours |
| Experiment 4 | 50 g | 5% | 150 mL | No free water after 24 hours |

From these experiments it was concluded that the water absorbent polymer has an impact on water uptake. However, the rate of water uptake decreases as more water is added.

While sampling indicated that the water absorbent polymers were present in the pellets, the theoretical uptake capacity of 50 g of a composition containing 2.5 g Stockosorb is 500 mL water. The 50 g compositions did not appear to be able to take up the theoretical capacity of water.

Example 4

Further experiments were conducted with a composition comprising 82.5% chicken manure (3:1 meat chicken manure to egg chicken manure), 10% Kelp meal and 7.5% water absorbent polymer. This composition was produced according to the procedure outlined in Example 2.

Experiments were conducted to determine whether there is a measurable performance difference between the granules and pellets, and also the maximum amount of water that may be absorbed by the water absorbent polymer in these compositions. The results of these experiments are outlined in Table 4.

TABLE 4

Amount of water absorbed in different compositions

| | Amount of composition | Type | % Stockosorb | mL Water Added | Comments |
|---|---|---|---|---|---|
| Control 3 | 20 g | Pellets | — | 100 mL | After 10 mins free water was 35 mL (Absorbed 65 mL) |
| Control 4 | 20 g | Granules | — | 100 mL | After 10 mins free water was 25 mL (Absorbed 75 mL) |
| Control 5 | 10 g | Pellets | — | 100 mL | After 65 mins free water was 50 mL (Absorbed 50 mL) |
| Control 6 | 10 g | Granules | — | 100 mL | After 65 mins free water was 40 mL (Absorbed 60 mL) |
| Composition 3 | 10 g | Pellets | 7.5% | 100 mL | Free water after 65 mins |
| Composition 4 | 10 g | Granules | 7.5% | 100 mL | Free water after 65 mins |
| Composition 5 | 10 g | Pellets | 5% | 100 mL | After 60 mins free water was 70 mL (Absorbed 30 mL) |
| Composition 6 | 10 g | Pellets | 7.5% | 100 mL | After 60 mins free water was 54 mL (Absorbed 46 mL) |

From these experiments it was concluded that neither the 10 g nor 20 g composition is capable of absorbing theoretical water capacity (the theoretical capacity of 10 g turf underlay is 150 mL water). However, it is clear that compositions in the form of granules absorb more water than compositions in the form of pellets, and that the compositions containing 7.5% water absorbent crystals absorb more water than compositions containing 5% water crystals.

Following these experiments, similar compositions were prepared and these were left to absorb water for a longer period of time. The results of these experiments are displayed in Table 5.

TABLE 5

Amount of water absorbed in different compositions over a longer period of time

| | Amount of Composition | Type | % Stockosorb | mL Water Added | Water absorbed after 63 Hours |
|---|---|---|---|---|---|
| Composition 3 | 10 g | pellets | 7.5% | 100 mL | Absorbed 67 mL (33 mL remaining) |
| Composition 4 | 10 g | granules | 7.5% | 100 mL | Absorbed 77 mL (23 mL remaining) |
| Composition 5 | 10 g | pellets | 5% | 100 mL | Absorbed 42 mL (58 mL remaining) |
| Composition 6 | 10 g | pellets | 7.5% | 100 mL | Absorbed 75 mL (25 mL remaining) |

From these experiments it was concluded that the water absorbent polymers do not absorb their theoretical capacity, even when left for more than two days. However, the polymers do continue to absorb past the one hour period.

It was determined that the EC of an extract of the composition is 9 to 10.3 mS/cm and the pH is 7.9 to 8.0.

The salinity of the composition may prevent the polymers from reaching their water uptake capacity. Accordingly, 100 mL of an extract of the composition (82.5% chicken manure (3:1 meat chicken manure to egg chicken manure), 10% Kelp meal and 7.5% water absorbent polymer) was added to a glass dish containing 0.75 grams of Stockosorb 500 crystals to validate whether the ability of the polymer to absorb water is reduced by the salinity of the composition or whether the polymer could have been damaged in the manufacturing process. The polymer did not absorb the entire solution over a three hour period. Of the 100 ml added to the polymer, 56 mL remained, so the polymers were only able to absorb 44 mL of the solution.

This indicates that the manufacturing process has not damaged the water absorbent polymer and that the salinity of the composition is reducing the polymer's capacity to absorb water. However, it is anticipated that as the composition degrades the impact of salinity should be reduced and the water absorbent polymers will be able to absorb a greater amount of water.

Example 5

An analysis of the amount of nitrogen, potassium and phosphorous in a composition comprising 95% chicken manure (3:1 meat chicken manure to egg chicken manure) and 5% Stockosorb 500 medium was conducted. The results are displayed in Table 6.

TABLE 6

NPK Analysis of composition comprising 5% Stockosorb

| Method | Total Nitrogen | Total Potassium | Total Phosphorous, asP |
|---|---|---|---|
|  | LECO, C—N analyses | EPA - total digestion | EPA - total digestion |
| Unit | % Wt | % Wt | % Wt |
| Experiment 1 | 3.55 | 2.43 | 1.61 |
| Experiment 2 | 3.71 | 2.29 | 1.67 |
| Experiment 3 | 3.73 | 2.27 | 1.48 |
| Average | 3.66 | 2.33 | 1.59 |

Example 6

An analysis of the amount of various elements in the compositions of Example 4, which comprised 82.5% chicken manure (3:1 meat chicken manure to egg chicken manure), 10% Kelp meal and 7.5% water absorbent polymer was next performed. The results are displayed in Table 7.

TABLE 7

Analysis of the elements in the compositions of Example 4

| Test summary | Method | Unit | Granular sample 1 | Granular sample 2 | Pellets sample 1 | Pellets sample 2 |
|---|---|---|---|---|---|---|
| Total Nitrogen, | LECO, C—N analyzes | % Wt | 3.7 | 4.02 | 3.56 | 3.5 |
| Total Potassium, | EPA-total digestion, ICP-OES | % Wt | 3.45 | 3.36 | 2.79 | 2.63 |
| Total Phosphorus, P | EPA-total digestion, ICP-OES | % Wt | 1.22 | 1.40 | 1.27 | 1.50 |
| Total Calcium, Ca | EPA-total digestion, ICP-OES | % Wt | 3.92 | | 4.06 | |
| Total Sulphur, S | EPA-total digestion, ICP-OES | % Wt | 0.88 | | 0.79 | |
| Total Sodium, Na | EPA-total digestion, ICP-OES | mg/kg | 6563.47 | | 6162.82 | |
| Magnesium | EPA-total digestion, ICP-OES | mg/kg | 4621.38 | | 4696.95 | |
| Boron | EPA-total digestion, ICP-OES | mg/kg | 23.38 | | 23.51 | |
| Chromium | EPA-total digestion, ICP-OES | mg/kg | 7.27 | | 6.23 | |
| Copper | EPA-total digestion, ICP-OES | mg/kg | 54.61 | | 57.20 | |
| Iron | EPA-total digestion, ICP-OES | mg/kg | 1403.16 | | 1431.77 | |
| Manganese | EPA-total digestion, ICP-MS | mg/kg | 286.04 | | 303.29 | |
| Nickel | EPA-total digestion, ICP-MS | mg/kg | 5.58 | | 5.57 | |
| Lead | EPA-total digestion, ICP-MS | mg/kg | 1.17 | | 1.24 | |
| Cadmium | EPA-total digestion, ICP-MS | mg/kg | 0.16 | | 0.17 | |
| Zinc | EPA-total digestion, ICP-MS | mg/kg | 294.77 | | 307.48 | |
| Arsenic | EPA-total digestion, ICP-MS | mg/kg | 6.77 | | 7.24 | |
| Mercury | EPA-total digestion, ICP-MS | mg/kg | <0.02 | <0.02 | <0.02 | <0.02 |
| Molybdenum | EPA-total digestion, ICP-MS | mg/kg | 3.97 | | 4.54 | |
| Chloride, Cl | Water soluble, Ion Chromatography | mg/kg | 6090.00 | | 5270.00 | |

Example 7

A pellet comprising 82.5% chicken manure (3:1 meat chicken manure to egg chicken manure), 10% Kelp meal and 7.5% water absorbent polymer was then treated with 100 mL. After 60 hours this mixture was filtered and the filtrate was analysed. The results are displayed in Table 8.

TABLE 8

Filtrate analysis

|  | Method | Unit | Amount in filtrate |
| --- | --- | --- | --- |
| Potassium, K | ICP-OES | mg/L | 1972 |
| Phosphorous, P | ICP-OES | mg/L | 86.8 |
| $NO_2$—N | Ion-Chromatography | mg/L | <1 |
| $NO_3$—N | Ion-Chromatography | mg/L | <1 |
| $NH_4$—N | Ion-Chromatography | mg/L | 913 |

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Those skilled in the art will appreciate that the invention described herein is susceptible to variations and modifications other than those specifically described. It is to be understood that the invention includes all such variations and modifications which fall within the spirit and scope. The invention also includes all of the steps, features, compositions and compounds referred to or indicated in this specification, individually or collectively, and any and all combinations of any two or more of said steps or features.

The invention claimed is:

1. A storage stable fertiliser composition in the form of pellets or granules comprising an organic fertiliser in admixture with a water absorbent polymer, wherein the organic fertiliser comprises from 85% to 99% of the composition.

2. A composition according to claim 1, wherein the organic fertiliser comprises manure.

3. A composition according to claim 1, wherein the organic fertiliser comprises animal manure.

4. A composition according to claim 2, wherein the manure is chicken manure.

5. A composition according to claim 2, wherein the manure is from 4:1 to 2:1 meat chicken manure to egg chicken manure.

6. A composition according to claim 1, wherein the organic fertiliser comprises plant meal.

7. A composition according to claim 6, wherein the plant meal is kelp meal.

8. A composition according to claim 1, wherein the water absorbent polymer is selected from the group consisting of a polyacrylamide copolymer, poly(acrylic acid) copolymer, ethylene maleic anhydride copolymer, cross-linked carboxymethyl-cellulose, polyvinyl alcohol copolymer, cross-linked polyethylene oxide and starch grafted copolymer of polyacrylonitrile.

9. A composition according to claim 1, wherein the water absorbent polymer is a crosslinked copolymer of acrylic acid and acrylamide partially neutralized as potassium/ammonium salt.

10. A composition according to claim 1, wherein the water absorbent polymer comprises from 4% to 8% of the composition.

11. A process for producing a storage stable fertiliser composition, the process comprising:
    i) mixing an organic fertiliser and a water absorbent polymer to form a mixture;
    ii) pelletising or granulating the mixture; and
    iii) drying the pellets or granules for a time and under conditions sufficient to form a storage stable fertiliser composition;
    wherein the organic fertiliser comprises from 85% to 99% of the storage stable fertiliser composition.

12. A process according to claim 11, wherein the process further comprises the step of crumbling the storage stable composition.

13. A process according to claim 11, wherein the moisture content of the mixture is from 18% to 30%.

14. A process according to claim 11, wherein the moisture content of the mixture is from 22% to 26%.

15. A process according to claim 11, wherein the organic fertiliser comprises manure.

16. A process according to claim 11, wherein the organic fertiliser comprises animal manure.

17. A process according to claim 15, wherein the manure is chicken manure.

18. A process according to claim 15, wherein the manure is from 4:1 to 2:1 meat chicken manure to egg chicken manure.

19. A process according to claim 11, wherein the fertiliser comprises plant meal.

20. A process according to claim 18, wherein the plant meal is kelp meal.

21. A process according to claim 11, wherein the water absorbent polymer is selected from the group consisting of a polyacrylamide copolymer, poly(acrylic acid) copolymer, ethylene maleic anhydride copolymer, cross-linked carboxymethyl-cellulose, polyvinyl alcohol copolymer, cross-linked polyethylene oxide and starch grafted copolymer of polyacrylonitrile.

22. A process according to claim 11, wherein the water absorbent polymer is a crosslinked copolymer of acrylic acid and acrylamide partially neutralized as potassium/ammonium salt.

23. A process according to claim 11, wherein the water absorbent polymer comprises from 4% to 8% of the composition.

* * * * *